(12) United States Patent
Tanabe

(10) Patent No.: US 7,802,911 B2
(45) Date of Patent: *Sep. 28, 2010

(54) BACKLIGHT DEVICE AND LIQUID CRYSTAL DISPLAY

(75) Inventor: Takayoshi Tanabe, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/437,005

(22) Filed: May 7, 2009

(65) Prior Publication Data

US 2009/0213301 A1 Aug. 27, 2009

Related U.S. Application Data

(63) Continuation of application No. 11/573,591, filed as application No. PCT/JP2005/011460 on Jun. 22, 2005, now Pat. No. 7,553,060.

(30) Foreign Application Priority Data

Sep. 10, 2004 (JP) ............... 2004-264549

(51) Int. Cl.
*F21V 7/04* (2006.01)
(52) U.S. Cl. .............. 362/612; 362/613; 362/631; 362/294
(58) Field of Classification Search ........... 362/612, 362/613, 630–634, 97.3, 555, 608, 800, 97.1, 362/97.2, 97.4, 294, 249.02–249.05; 349/61–68
See application file for complete search history.

(56) References Cited

U.S. PATENT DOCUMENTS 6,966,674 B2 * 11/2005 Tsai ............... 362/294
7,553,060 B2 * 6/2009 Tanabe ............ 362/612
2004/0004424 A1   1/2004 Sakurai
2004/0080924 A1 * 4/2004 Chuang ............ 362/27

FOREIGN PATENT DOCUMENTS

| JP | 02-106719 A   | 4/1990  |
|----|---------------|---------|
| JP | 2003-121840 A | 4/2003  |
| JP | 2003-339936 A | 12/2003 |
| JP | 2004-006193 A | 1/2004  |
| JP | 2004-095422 A | 3/2004  |
| JP | 2004-207411 A | 7/2004  |

OTHER PUBLICATIONS

Tanabe; "Backligth Device and Liquid Crystal Display"; U.S. Appl. No. 11/573,591, filed Feb. 12, 2007.
Official Communication issued in corresponding Japan Patent Application No. 2006-535048, mailed on Sep. 3, 2009.

* cited by examiner

*Primary Examiner*—Bao Q Truong
(74) *Attorney, Agent, or Firm*—Keating & Bennett, LLP

(57) ABSTRACT

A backlight apparatus of a sidelight type includes a light guide plate having an incident face on a lateral face and a light source unit having a plurality of substrates. The plurality of substrates are respectively disposed on the incident face side of the light guide plate such that each of substrate faces of the substrates is parallel with a light exit face of the light guide plate, and the substrates are adjacent to one another in a thickness direction of the light guide plate. A plurality of light emitting devices that emit light along the substrate faces are mounted in columns on each of the substrate faces of the plurality of substrates such that emitting directions of the light emitting devices are directed to the incident face.

7 Claims, 16 Drawing Sheets

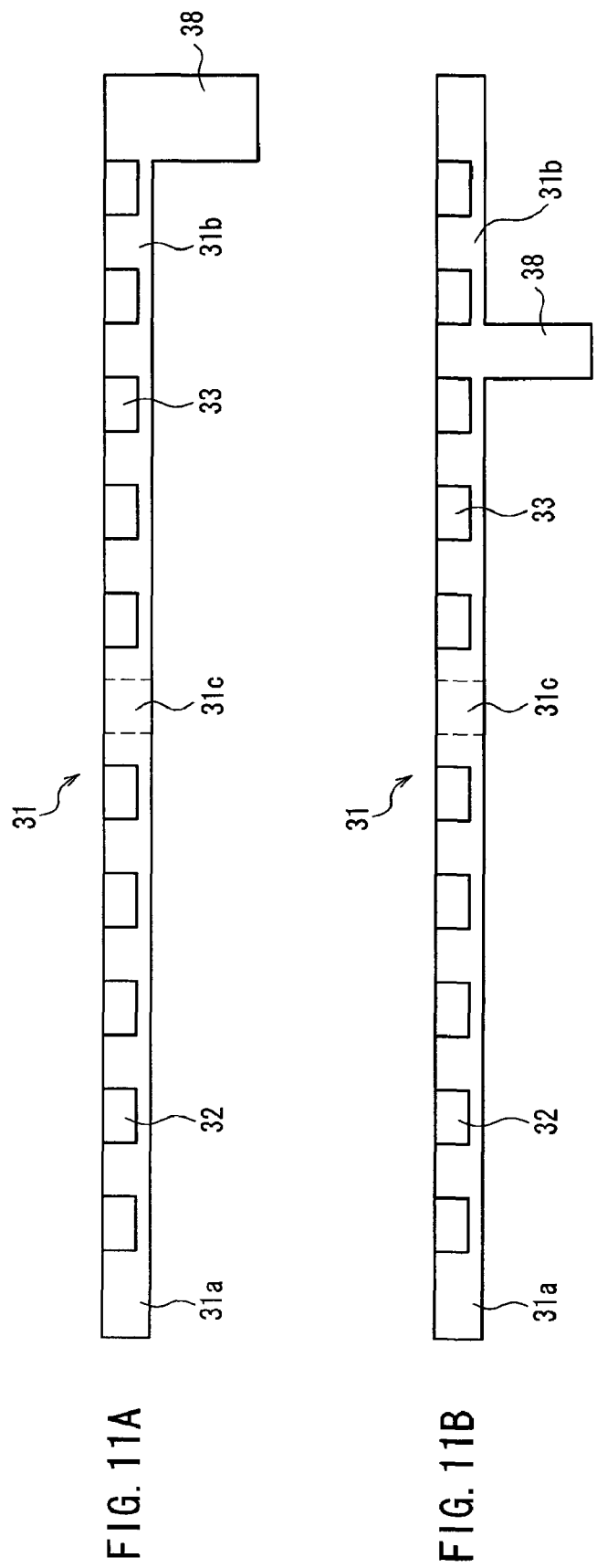

BACKLIGHT DEVICE AND LIQUID CRYSTAL DISPLAY

BACKGROUND OF THE INVENTION

1. Field of the Invention

The present invention relates to a sidelight-type backlight apparatus for a liquid crystal display, and a liquid crystal display using the same.

2. Description of the Related Art

Recently, the reduction of thicknesses, sizes and weights of liquid crystal displays, the increases of their brightness and the savings of their power consumption have been demanded. In order to respond to these demands, a backlight apparatus using a light emitting diode (hereinafter, simply called an "LED") as a light source, instead of using a fluorescent lamp, has been developed. A backlight apparatus using an LED as a light source can reduce its size and can save its power consumption because of its structure, compared with the case of using a fluorescent lamp. Moreover, the backlight apparatus does not contain mercury that is contained in a fluorescent lamp, and thus has excellent environmental friendliness. Thus, the backlight apparatuses using LEDs as the light sources are increasingly applied to liquid crystal displays that have small-sized screens for portable terminals such as mobile phones and PDAs, in particular.

As a representative example of the backlight apparatus using the LED as the light source, a sidelight-type backlight apparatus is known. See, for example, JP 11 (1999)-353920 A (Patent Document 1) and JP 2001-43717 A (Patent Document 2). FIG. 16 is a perspective view showing an example of a structure of a conventional sidelight-type backlight apparatus. Moreover, FIG. 17 is a perspective view showing another example of the structure of the conventional sidelight-type backlight apparatus.

As shown in FIG. 16, in the sidelight-type backlight apparatus, a plurality of channels are provided on one lateral face 53 of a light guide plate 51 such that an inside face of the channel serves as an incident face 54. Moreover, a main face on one side of the light guide plate 51 (an upper side in the figure) serves as a light exit face 55. In the example of FIG. 16, in order to suppress a brightness irregularity and a color irregularity of the display screen, a plurality of LEDs 52 are disposed as the light sources. The plurality of the LEDs 52 are arranged along a thickness direction of the light guide plate 51 and a direction perpendicular to the thickness direction, on the incident face 54 side of the light guide plate 51. An emitting direction of each LED 52 is directed to the incident face 54. It should be noted that a structure of the attachment of the LED 52 is not illustrated in FIG. 16.

Moreover, on a lateral face on which the incident face 54 is not provided and on a main face opposed to the light exit face 55, a reflection plate or a reflection sticker is attached, which is not illustrated in FIG. 16. Thus, emitting light from the LED 52 is incident from the incident face 54 to an inside of the light guide plate 51, repeats reflection inside the light guide plate 51, and thereafter, exits from the light exit face 55 of the light guide plate 51.

As a structure of arranging the plurality of the LEDs, a structure using a substrate shown in FIG. 17 is known. See, for example, JP 2002-75038 A (Patent Document 3). As shown in FIG. 17, on the substrate 56, the plurality of the LEDs 52 for irradiating with light toward a normal line direction of a substrate face are mounted. This substrate 56 on which the LEDs 52 are mounted is disposed so as to be parallel with the lateral face 53 of the light guide plate 51. According to this structure, the plurality of the LEDs 52 can be arranged easily.

The backlight using such LEDs as the light sources can contribute to the reductions of a thickness and a weight of a liquid crystal display, the use of less mercury (environmental friendliness) because of not using a fluorescent lamp, and the saving of the power consumption. Thus, the application of the backlight apparatus to liquid crystal displays that have large-sized screens, for example, liquid crystal monitors for personal computers and liquid crystal televisions is also expected in the future.

By the way, in the light guide plate constituting the backlight apparatus, the main face (the light exit face) is required to have a larger area, as the screen size of the liquid crystal display is larger. Whereas, in the light of the reduction of the thickness of the liquid crystal display, an increase of a thickness (an area of the lateral face) of the light guide plate is required to be suppressed as much as possible.

Accordingly, a ratio of the area of the lateral face of the light guide plate with respect to the display area of the liquid crystal display is decreased, as the screen size of the liquid crystal display is increased, and as a result, a ratio of a mounting area of the substrate for mounting the LED with respect to the display area is also decreased, as the screen size of the liquid crystal display is increased. Moreover, an amount of light that can be emitted by one LED is limited. Thus, in order to secure sufficient brightness by using the backlight apparatus having the LED as the light source in a liquid crystal display that has a large-sized screen, a mounting density of the LEDs to be mounted on the substrate is required to be higher, as the area of the main face of the light guide plate in the backlight is a larger.

However, for example, in the example of FIG. 17, a pitch between the LEDs 52 to be mounted on the substrate 56 is limited by a function of a mounter and securing of a soldering region. Moreover, even when the plurality of the LEDs 52 are arranged and mounted also in the thickness direction of the light guide plate 51 so as to increase the number of the LEDs 52 as shown in FIG. 16, a pitch between the LEDs 52 that are adjacent in the thickness direction is also limited similarly to the above-described case.

Because of these reasons, the mounting density of the LEDs 52 that can be mounted on the substrate 56 has a limitation. Thus, in the case where the sidelight-type backlight apparatus that has the conventional LEDs as the light sources is applied to a liquid crystal display that has a large-sized screen, it is extremely difficult to secure sufficient brightness.

SUMMARY OF THE INVENTION

The object of the present invention is to solve the above-described problems, and to provide a backlight apparatus, which can increase a light amount by increasing the number of light emitting devices that can be disposed, and a liquid crystal display using the same.

In order to attain the object described above, a first backlight apparatus of the present invention is a backlight apparatus of a sidelight type including: a light guide plate having an incident face on a lateral face; and a light source unit having a plurality of substrates, wherein the plurality of the substrates are respectively disposed on the incident face side of the light guide plate such that each of substrate faces of the substrates is parallel with a main face of the light guide plate, and the substrates are adjacent to one another in a thickness direction of the light guide plate, and a plurality of light emitting devices that emit light along the substrate faces are mounted in columns on each of the substrate faces of the plurality of the substrates such that emitting directions of the light emitting devices are directed to the incident face.

In order to attain the object described above, a second backlight apparatus of the present invention is a backlight apparatus of a sidelight type including: a light guide plate having an incident face on a lateral face; and a light source unit having a flexible substrate, wherein the flexible substrate includes a plurality of mounting regions, and is folded at a part except for the mounting regions such that mounting faces of the plurality of the mounting regions are parallel with a main face of the light guide plate, and a plurality of light emitting devices are mounted in columns on each of the mounting faces of the plurality of the mounting regions such that emitting directions of the light emitting devices are directed to the incident face.

Moreover, in order to attain the object described above, a liquid crystal display of the present invention is provided with the first backlight apparatus or the second backlight apparatus of the present invention.

As described above, in the first backlight apparatus of the present invention, the light source unit is structured such that the plurality of the substrates on which the plurality of the light emitting devices are mounted are superimposed in the thickness direction of the light guide plate. Moreover, in the second backlight apparatus of the present invention, the light source unit is structured such that the flexible substrate on which the plurality of the light emitting devices are mounted in each mounting region is folded at a part except for the mounting regions, and the mounting regions are superimposed in the thickness direction of the light guide plate.

Thus, according to the backlight apparatus of the present invention, since a pitch between the light emitting devices in the thickness direction of the light guide plate can be shorten, it is possible increase the light amount by increasing the number of the light emitting devices that can be disposed.

BRIEF DESCRIPTION OF THE DRAWINGS

FIG. 1A is a perspective view thereof, and FIG. 1B is a side view thereof seen from an incident face side.

FIG. 2A is a perspective view thereof, and FIG. 2B is a side view thereof seen from the incident face side.

FIG. 4A is a perspective view thereof, and FIG. 4B is a side view thereof seen from an incident face side.

FIG. 5A is a perspective view thereof, and FIG. 5B is a side view thereof seen from an incident face side.

FIG. 6A is a perspective view thereof, and FIG. 6B is a side view thereof seen from the incident face side.

FIG. 7A is a perspective view thereof, and FIG. 7B is a side view thereof seen from the incident face side.

FIG. 8A is a perspective view thereof, and FIG. 8B is a side view thereof seen from an incident face side.

FIG. 10A is a perspective view thereof, and FIG. 10B is a side view thereof seen from the incident face side.

FIGS. 11A and 11B are plan views showing an example where a connection portion is formed on the flexible substrate shown in FIG. 9, and FIGS. 11A and 11B respectively show examples where positions for forming the connection portion are different from each other.

FIG. 13A is a perspective view thereof, and FIG. 13B is a side view thereof.

FIG. 14A is a perspective view thereof, and FIG. 14B is a side view thereof.

FIG. 15A is a perspective view thereof, and FIG. 15B is a side view thereof.

DETAILED DESCRIPTION OF THE PREFERRED EMBODIMENTS

Figure 1A:
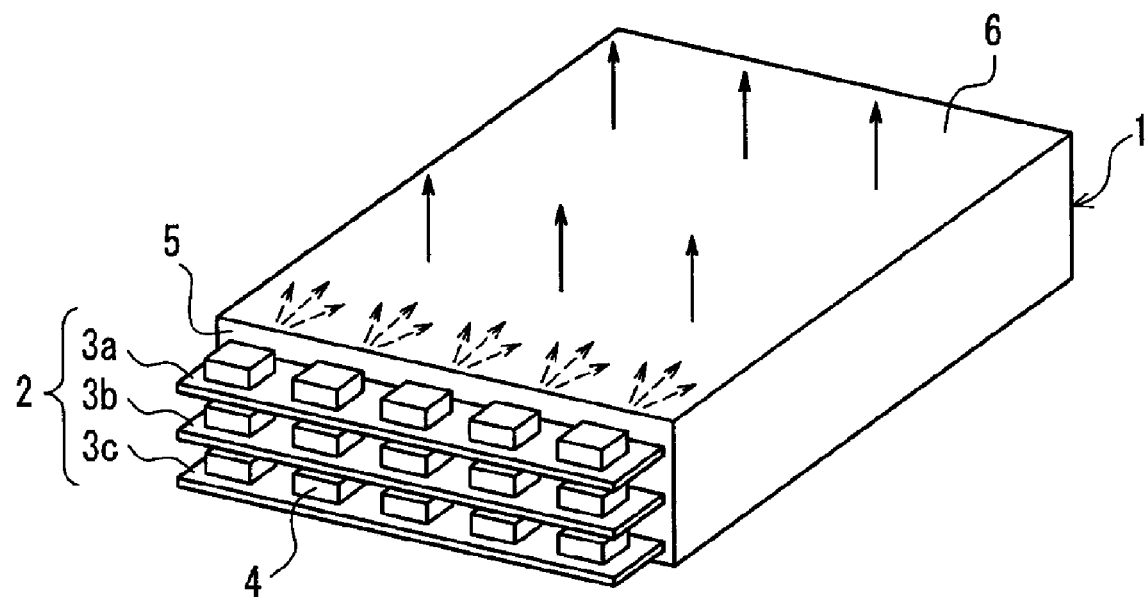
FIGS. 1A and 1B are views schematically showing a structure of a first example of a backlight apparatus according to Embodiment 1 of the present invention.

In order to attain the object described above, a first backlight apparatus of the present invention is a backlight apparatus of a sidelight type including: a light guide plate having an incident face on a lateral face; and a light source unit having a plurality of substrates, wherein the plurality of the substrates are respectively disposed on the incident face side of the light guide plate such that each of substrate faces of the substrates is parallel with a main face of the light guide plate, and the substrates are adjacent to one another in a thickness direction of the light guide plate, and a plurality of light emitting devices that emit light along the substrate faces are mounted in columns on each of the substrate faces of the plurality of the substrates such that emitting directions of the light emitting devices are directed to the incident face.

The above-described backlight apparatus according to the present invention preferably has a heat sink plate that is disposed between each of the plurality of the substrates and another substrate which is adjacent to the substrate. According to this, heat dissipation of the light source unit can be increased, and deterioration of the light emitting device caused by heat can be suppressed.

Also, the above-described backlight apparatus according to the present invention preferably has adjacent two substrates among the plurality of the substrates which are disposed such that mounting faces of the two substrates face each other, and has a plurality of light emitting devices that are mounted on one of the two substrates and a plurality of light emitting devices that are mounted on other one of the two substrates are mounted in positions that are not overlapped with each other in the thickness direction of the light guide plate. According to this, since the number of the light emitting devices that can be disposed can be increased further, the light amount can be increased further.

Moreover, in order to attain the object described above, a second backlight apparatus of the present invention is a backlight apparatus of a sidelight type including: a light guide plate having an incident face on a lateral face; and a light source unit having a flexible substrate, wherein the flexible substrate includes a plurality of mounting regions, and is folded at a part except for the mounting regions such that mounting faces of the plurality of the mounting regions are parallel with a main face of the light guide plate, and a plurality of light emitting devices are mounted in columns on each of the mounting faces of the plurality of the mounting regions such that emitting directions of the light emitting devices are directed to the incident face. According to the second backlight apparatus described above, the cost can be saved, compared with the first backlight apparatus described above.

In the above-described second backlight apparatus according to the present invention, it is preferable that the flexible substrate is folded such that mounting faces of at least two mounting regions among the plurality of the mounting regions face one another, and a light emitting device that is mounted on one of the mounting regions and a light emitting device that is mounted on other one of the mounting regions are mounted in positions that are not overlapped with one another in a thickness direction of the light guide plate. According to this, since the number of the light emitting devices that can be disposed can be increased further, the light amount can be increased further.

Moreover, the above-described first and second backlight apparatuses according to the present invention can also have an end portion of the light guide plate on the incident face side which has a portion that is formed such that a thickness of the portion is gradually increased as is closer to the incident face. According to this, regardless of a length (the number of stages of the light emitting devices that are superimposed) of the light guide plate in its thickness direction in the light source unit, a thickness of a portion of a light exit face of the light guide plate can be decreased. Thus, a thickness and a weight of the backlight apparatus itself can be reduced, and accordingly, a thickness and a weight of the liquid crystal display on which this backlight apparatus is mounted also can be reduced.

Moreover, in the above-described first and second backlight apparatuses according to the present invention, light emitting diodes that emit light along the substrate face can be used as the plurality of the light emitting devices. In this case, the plurality of the light emitting devices may be white color light emitting diodes, and may also contain a red color light emitting diode, a green color light emitting diode and a blue color light emitting diode.

Moreover, in order to attain the object described above, the liquid crystal display of the present invention is provided with the above-described first or second backlight apparatus according to the present invention.

Preferred Embodiment 1

Figure 1B:
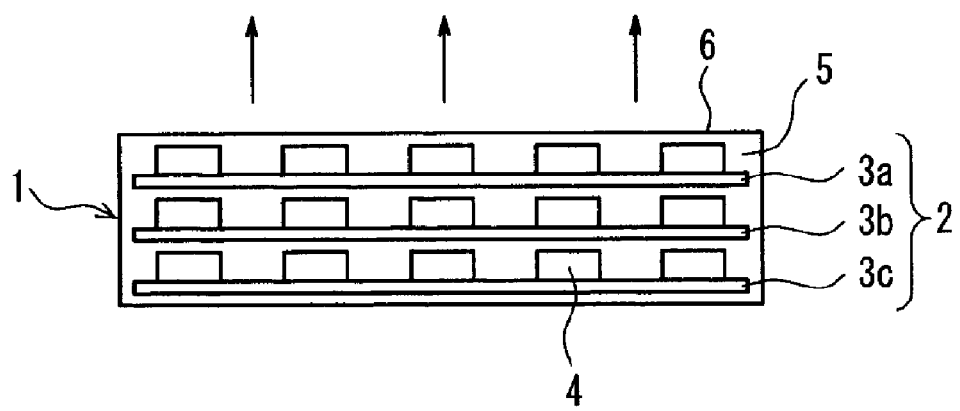

A backlight apparatus according to Embodiment 1 of the present invention will be described below with reference to FIGS. 1A, 1B, 2A, and 2B. FIGS. 1A and 1B are views schematically showing a structure of a first example of the backlight apparatus according to Embodiment 1 of the present invention, FIG. 1A is a perspective view thereof, and FIG. 1B is a side view thereof seen from an incident face side.

As shown in FIGS. 1A and 1B, the backlight apparatus of the present embodiment is a sidelight-type backlight apparatus. The backlight apparatus is provided with a light guide plate 1 and a light source unit 2. In the example of FIGS. 1A and 1B, the light guide plate 1 is a plate body having two rectangular-shaped main faces and four rectangular-shaped lateral faces, and one of the lateral faces serves as an incident face 5. Moreover, one of the main faces on one side of the light guide plate 1 (on an upper side in the figure) serves as a light exit face 6.

Moreover, as shown in FIGS. 1A and 1B, the light source unit 2 is provided with a plurality of substrates 3a to 3c. The substrates 3a to 3c are respectively disposed on the incident face 5 side of the light guide plate 1 such that substrate faces of the substrates are parallel with the main face (the light exit face 6) of the light guide plate 1, and the substrates are adjacent to one another in a thickness direction of the light guide plate 1.

Further, on each of the substrate faces of the substrates 3a to 3c, a plurality of light emitting devices 4 that emit light along the substrate faces are mounted such that emitting directions thereof are directed to the incident face 5. Moreover, the plurality of the light emitting devices 4 are arranged in columns in a direction (hereinafter called a "transverse direction") that is perpendicular to the thickness direction of the light guide plate 1 and is parallel with the lateral face serving as the incident face 5. In the example of FIGS. 1A and 1B, the light emitting devices 4 are side emission-type LEDs.

Figure 16:
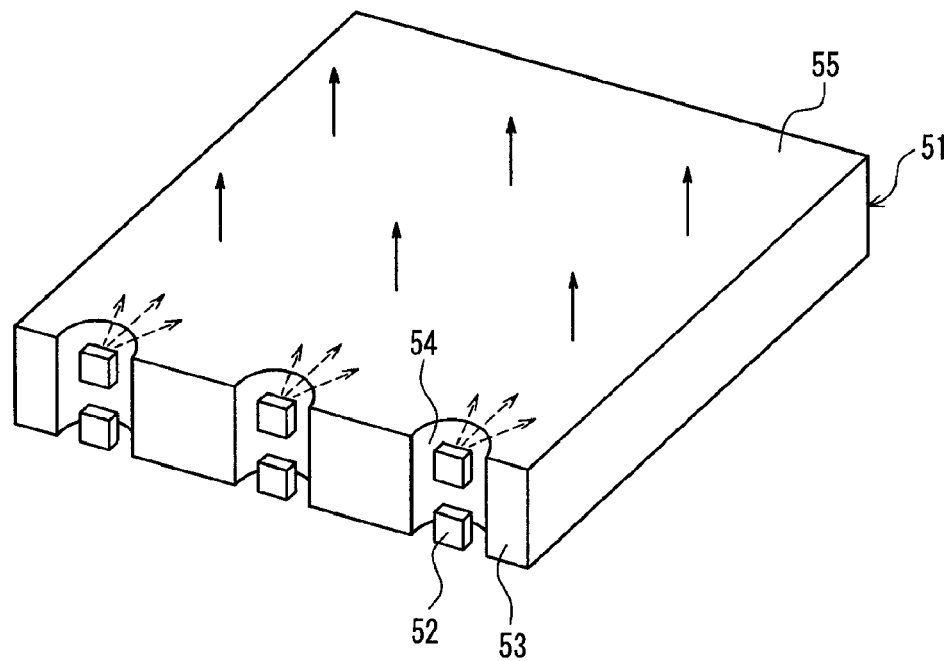
FIG. 16 is a perspective view showing an example of a structure of a conventional sidelight-type backlight apparatus.
Figure 17:
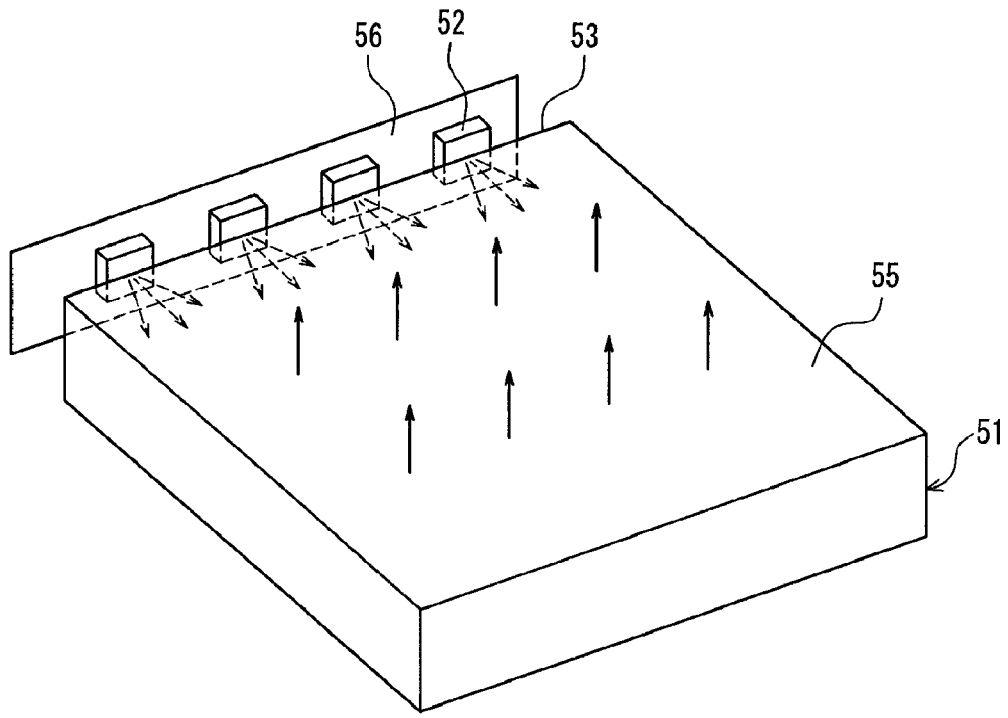
FIG. 17 is a perspective view showing another example of the structure of the conventional sidelight-type backlight apparatus.

As described above, the light source unit 2 of the backlight apparatus shown in FIGS. 1A and 1B is structured such that the substrates 3a to 3c on which the plurality of the light emitting devices 4 are mounted in columns are superimposed in the thickness direction of the light guide plate 1 (hereinafter, called a "longitudinal direction"). Thus, compared with the example shown in FIGS. 16 and 17 in Background Art, a pitch between the light emitting devices 4 in the longitudinal direction can be shorten, and thus a density of the light emitting devices 4 on the incident face 5 (or the lateral face of the light guide plate) can be higher, so that the number of light emitting devices that can be disposed can be increased.

Thus, the backlight apparatus shown in FIGS. 1A and 1B can also be used for liquid crystal displays having large-sized screens, for example, liquid crystal monitors for personal computers and liquid crystal televisions, and sufficient brightness can be secured also in these cases. Further, compared with the case of using a fluorescent lamp as the light source, a thickness and a weight of a liquid crystal display can be reduced, and power consumption thereof can be saved. Moreover, environmental friendliness can also be improved by using less mercury.

Moreover, in the backlight apparatus shown in FIGS. 1A and 1B, the light emitting devices 4 on each of the substrates 3a to 3c separately can be switched on and off so as to adjust a light amount. For example, the light amount can be adjusted by three stages of: switching on only the light emitting devices 4 that are mounted on any one of the substrates; switching on the light emitting devices 4 that are mounted on any two of the substrates; and switching on all of the light emitting devices 4. In the case of adjusting the light amount in such a manner, occurrence of a brightness irregularity can be suppressed more, compared with the case of adjusting the light amount by switching on the light emitting devices 4 at an interval of one or two in the transverse direction.

In Embodiment 1, the light emitted from the light exit face 6 of the light guide plate 1 is preferably white. In this case, on each of the substrates 3a to 3c, a white color LED is preferably mounted as the light emitting device 4. Examples of the white color LED include a white color LED constituted by combining a GaN-based blue color LED with a YAG-based fluorescent body, and a white color LED using ZnSe.

Moreover, it is also possible that, for example, a red color (R) LED is mounted on the substrate 3a, a green color (G) LED is mounted on the substrate 3b, and a blue color (B) LED is mounted on the substrate 3c, so that a white color is made inside the light guide plate 1. Also, it is also possible that a red color LED, a green color LED and a blue color LED are mounted alternately on the respective substrates, so that a white color is made inside the light guide plate 1.

Further, in the example of FIGS. 1A and 1B, the LEDs are used as the light emitting devices 4, but Embodiment 1 is not limited to this. Besides the LEDs, for example, organic electroluminescent (EL) devices can also be used as the light emitting devices 4.

Moreover, in Embodiment 1, the substrates 3a to 3c may be rigid substrates formed of an epoxy resin or the like, and may also be flexible substrates formed of a polyimide resin, a polyester resin or the like. In addition, on the substrates 3a to 3c, wiring patterns for supplying electric powers to the light emitting devices 4 are formed, which are not illustrated in FIGS. 1A and 1B.

Figure 2A:
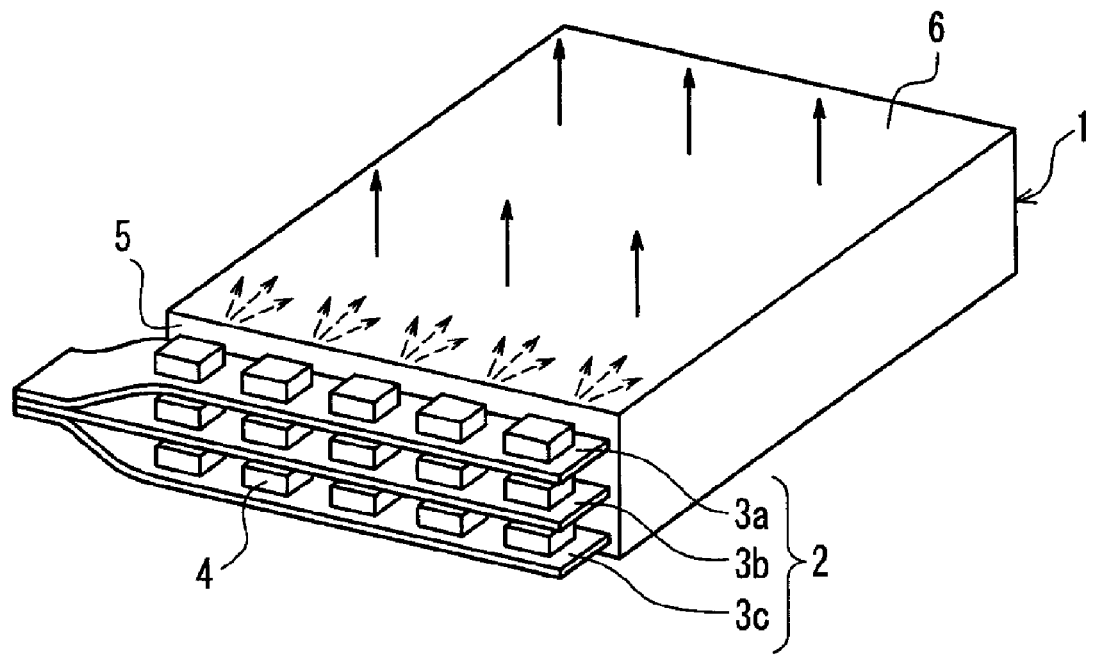
FIGS. 2A and 2B are views schematically showing a structure of a second example of the backlight apparatus according to Embodiment 1 of the present invention.
Figure 2B:
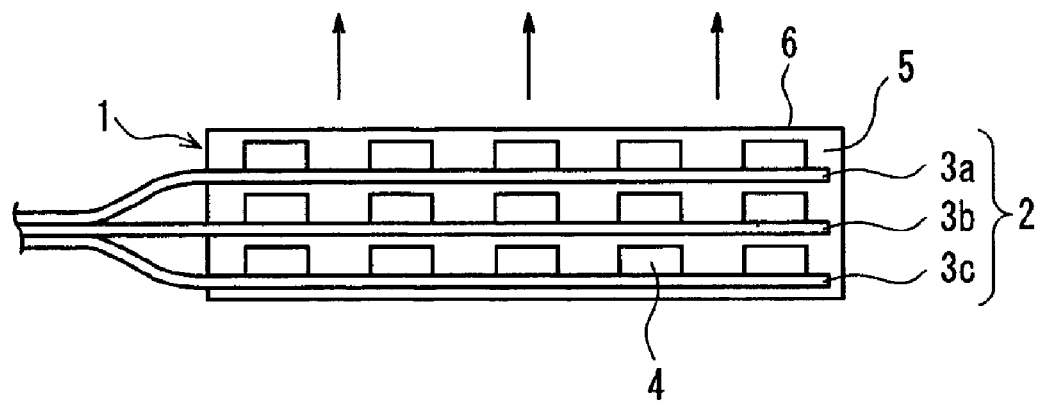

In Embodiment 1, as shown in FIGS. 2A and 2B, it is also possible that end portions of the substrates 3a to 3c are combined into one. FIGS. 2A and 2B are views schematically showing a structure of a second example of the backlight apparatus according to Embodiment 1 of the present invention, FIG. 2A is a perspective view thereof, and FIG. 2B is a side view thereof seen from the incident face side.

In the example of FIGS. 2A and 2B, the substrates 3a to 3c are flexible substrates, and terminals (not illustrated) of the respective substrates are connected with one another by crimping or soldering. In the case of the example shown in FIGS. 2A and 2B, substrates with the same shapes and the same structures may be used as the substrates 3a to 3c. Thus, since the substrates are only of one kind, an efficiency of the development can be improved. Moreover, in the case of increasing the number of the substrates, designing and setting of the substrates to be added can be achieved easily. From these points, in the case of the example shown in FIGS. 2A and 2B, the cost required for the development of the backlight apparatus can be reduced.

In Embodiment 1, a shape of the light guide plate 1 is not particularly limited, as long as it has the incident face on its lateral face. For example, the light guide plate may have a channel or a concave portion corresponding to the light emitting device which is provided on the lateral face, and an inside face of this channel or this concave portion which serves as the incident face, similarly to the example shown in FIG. 16 in Background Art. Moreover, in Embodiment 1, the number of the substrates and the number of the light emitting devices are not limited particularly.

It should be noted that FIGS. 1A, 1B, 2A, and 2B show only main parts that constitute the backlight apparatus. The backlight apparatus shown in FIGS. 1A, 1B, 2A, and 2B is provided with a light controlling device on the light exit face 6, which is not illustrated though. Moreover, the reflection members are attached on the lateral face that does not serve as the incident face 5 and on the main face opposed to the light exit face 6, such that reflection faces of the reflection members face the inside of the light guide plate 1, which are not illustrated.

Figure 3:
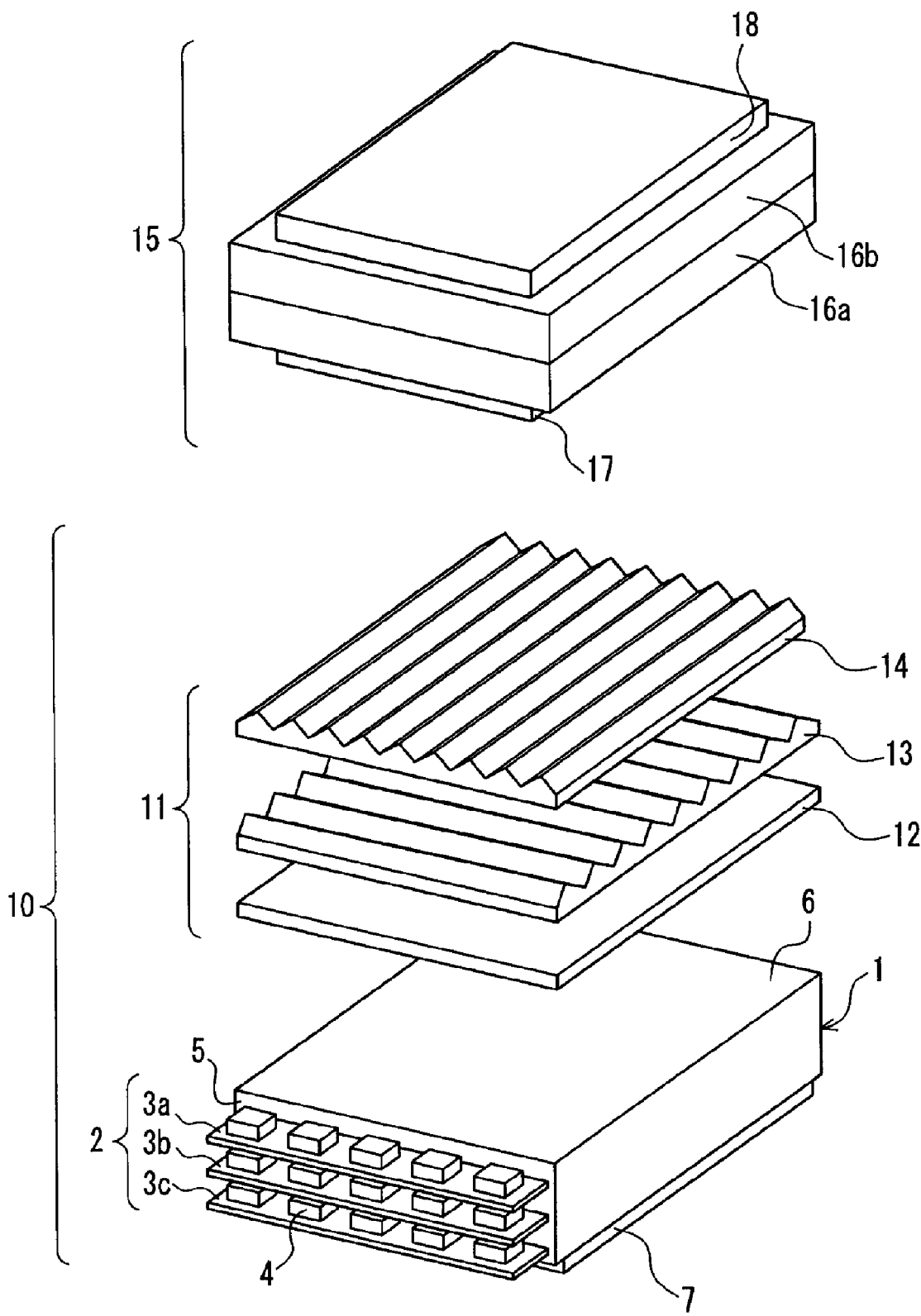
FIG. 3 is an exploded perspective view showing a structure of a liquid crystal display according to Embodiment 1 of the present invention.

A structure of a liquid crystal display according to Embodiment 1 will be described with reference to FIG. 3. FIG. 3 is an exploded perspective view showing the structure of the liquid crystal display according to Embodiment 1 of the present invention. As shown in FIG. 3, the liquid crystal display according to Embodiment 1 is provided with the backlight apparatus 10 shown in FIGS. 1A and 1B and a liquid crystal display panel 15.

Moreover, as shown in FIG. 3, the backlight apparatus 10 is provided with the light guide plate 1 and the light source unit 2 that are shown in FIGS. 1A and 1B, and a light controlling device 11 that is not illustrated in FIGS. 1A and 1B. The light controlling device 11 is disposed on the light exit face 6 of the light guide plate 1. The light controlling device 11 is formed by superimposing a diffusion sheet 12, a lower prism sheet 13 and an upper prism sheet 14 in this order. Reference numeral 7 denotes a reflection sheet that is attached on the main face that is opposed to the light exit face 6 of the light guide plate 1.

It should be noted that the structure of the light controlling device 11 is not limited to the example shown in FIG. 3. For example, it is also possible that one more diffusion sheet is disposed further on the light controlling device 11, and that the light controlling device 11 is constituted only of the diffusion sheet. Further, it is also possible that the light controlling device 11 is constituted by using a lens sheet instead of the lower prism sheet 13 and the upper prism sheet 14, and using one each of the diffusion sheet 12 and the lens sheet. Moreover, it is possible to use one prism sheet with a prism ridgeline that faces down, instead of the diffusion sheet 12 and the prism sheets 13 and 14, and to dispose the diffusion sheet thereon.

Moreover, the light controlling device 11 may also have a structure where a polarized light selective reflection sheet called as DBEF (a name called by 3M (product name)) manufactured by 3M is added. Further, it is also possible to use a lens sheet that has a layer formed of a polarized light selective reflection sheet called as BEF-RP (a name called by 3M (product name)) manufactured by 3M, instead of the lower prism sheet 13 or the upper prism sheet 14.

Moreover, as shown in FIG. 3, the liquid crystal display panel 15 is disposed on the light controlling device 11. The liquid crystal display panel 15 is provided with an array substrate 16a on which a plurality of TFT devices are formed in matrix, a filter substrate 16b and a liquid crystal (not illustrated) that intervenes between the array substrate 16a and the filter substrate 16b. Moreover, on a lower face of the array substrate 16a, a lower polarization plate 17 is attached. On an upper face of the filter substrate 16b, an upper polarization plate 18 is attached. Incidentally, the structure of the liquid crystal display panel 15 is not limited to the example shown in FIG. 3.

According to such a structure, the light emitted from the light exit face 6 of the light guide plate 1 of the backlight apparatus 10 passes through the light controlling device 11, and illuminates the liquid crystal display panel 15. As a result, on a display screen of the liquid crystal display panel 15, an image is formed. Moreover, even if the liquid crystal display panel 15 is the liquid crystal display panel 15 having a large-sized screen for a PC monitor, a liquid crystal television and the like, the backlight apparatus 10 can be applied thereto, as described above. Further, it is also possible to combine the light controlling device and the liquid crystal display panel 15 that are shown in FIG. 3 with backlight apparatuses that will be described below in the respective embodiments. Also in these cases, liquid crystal displays can be obtained similarly.

Preferred Embodiment 2

Figure 4A:
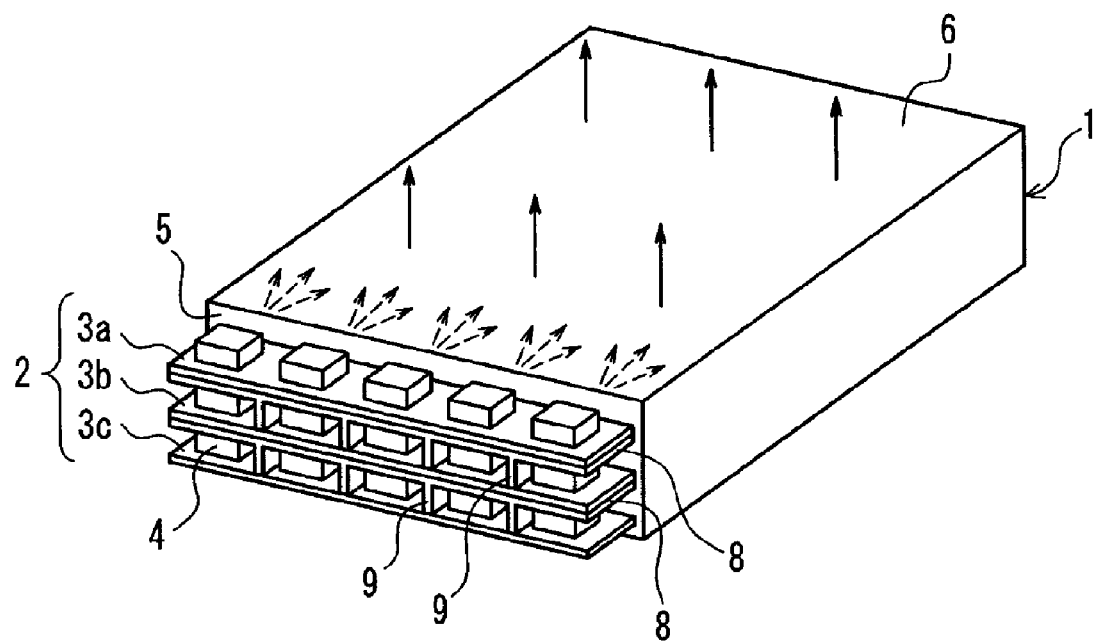
FIGS. 4A and 4B are views schematically showing a structure of a backlight apparatus according to Embodiment 2 of the present invention.
Figure 4B:
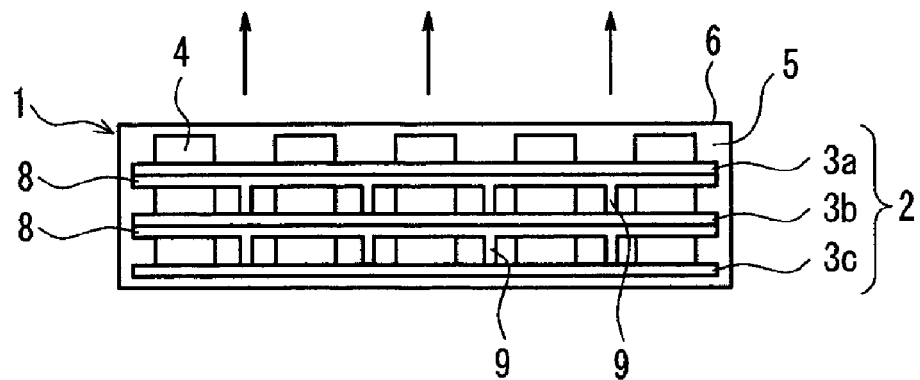

Next, a backlight apparatus according to Embodiment 2 of the present invention will be described with reference to FIGS. 4A and 4B. FIGS. 4A and 4B are views schematically showing a structure of the backlight apparatus according to Embodiment 2 of the present invention, FIG. 4A is a perspective view thereof, and FIG. 4B is a side view thereof seen from an incident face side.

As shown in FIGS. 4A and 4B, the backlight apparatus of Embodiment 2 is also a sidelight-type backlight apparatus similarly to that of Embodiment 1. Moreover, the backlight apparatus of Embodiment 2 is also provided with the light source unit 2 on the incident face 5 side of the light guide plate 1, similarly to that of Embodiment 1.

However, as shown in FIGS. 4A and 4B, the backlight apparatus of Embodiment 2 is provided with heat sink plates 8 between the substrate 3a and the substrate 3b adjacent to the substrate 3a that constitute the light source unit 2, and between the substrate 3b and the substrate 3c that is adjacent to the substrate 3b, respectively, unlike the backlight apparatus of Embodiment 1. In the example of FIGS. 4A and 4B, the heat sink plates 8 are in touch with upper faces of the light emitting devices 4 and a lower face of the substrate 3a or the substrate 3b. Moreover, each of the heat sink plates 8 is provided with a fin 9 so as to block between the light emitting devices 4 that are mounted in columns, and heat accumulated between the light emitting devices 4 is released by the fin 9.

Thus, according to the backlight apparatus of Embodiment 2, a heat dissipation property of the light source unit 2 can be improved more, compared with the backlight apparatus of Embodiment 1. As a result, deterioration of the light emitting device 4 by heat can be suppressed, and a lifetime of the backlight apparatus can be increased. Moreover, an emission efficiency and a rated current can also be increased. The backlight apparatus according to Embodiment 2 is effective in the case of increasing the number of the substrates to be disposed and the number of the light emitting devices to be mounted thereon so as to increase a heat value of the light source unit 2.

Moreover, the backlight apparatus according to Embodiment 2 is structured similarly to the backlight apparatus according to Embodiment 1 except that the heat sink plates 8 are disposed. Thus, also in the backlight apparatus of Embodiment 2, compared with the example shown in FIGS. 16 and 17 in Background Art, the pitch between the light emitting devices 4 in the longitudinal direction can be shorten, the density of the light emitting devices 4 on the incident face 5 can be higher, and the number of the light emitting devices that can be disposed can be increased. Further, also in the backlight apparatus shown in FIGS. 4A and 4B, the light emitting devices 4 on each of the substrates separately can be switched on and off so as to adjust the light amount.

It should be noted that the number and structures of the heat sink plates 8 are not limited particularly in Embodiment 2. For example, the heat sink plate 8 may be disposed on an upper side of the substrate 3a or a lower side of the substrate 3c. Also, the heat sink plate 8 may have a structure that does not include the fin 9. Examples of a material of the heat sink plate 8 include metal materials having excellent heat dissipation, such as stainless steel, aluminum, copper and iron.

Moreover, FIGS. 4A and 4B show only main parts constituting the backlight apparatus. The backlight apparatus shown in FIGS. 4A and 4B are provided with the light controlling device on the light exit face 6, which is not illustrated though. Further, the reflection members are attached on the lateral face that does not serve as the incident face 5 and on the main face opposed to the light exit face 6, such that reflection faces of the reflection members face the inside of the light guide plate 1, which are not illustrated.

Preferred Embodiment 3

Figure 5A:
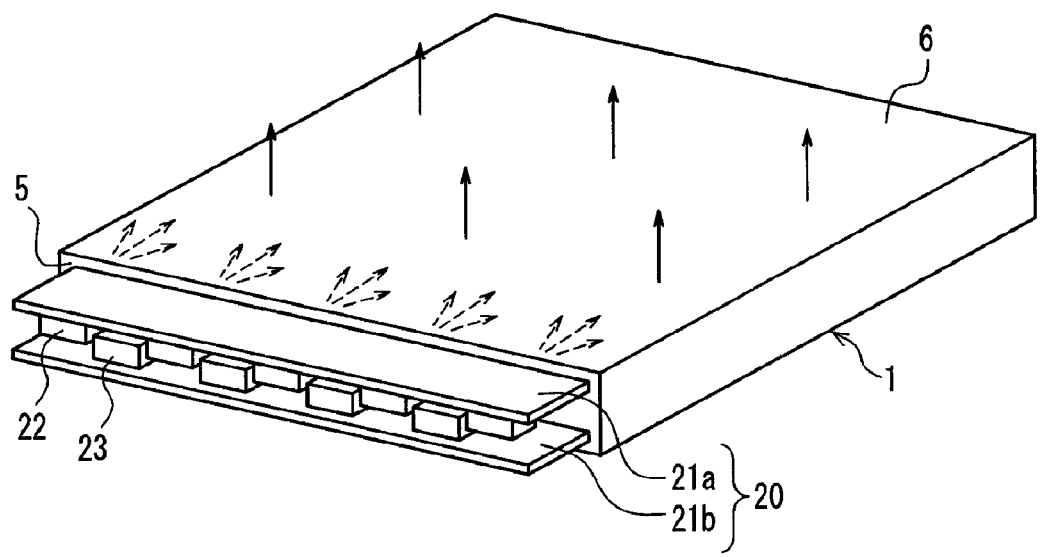
FIGS. 5A and 5B are views schematically showing a structure of a first example of a backlight apparatus according to Embodiment 3 of the present invention.
Figure 5B:
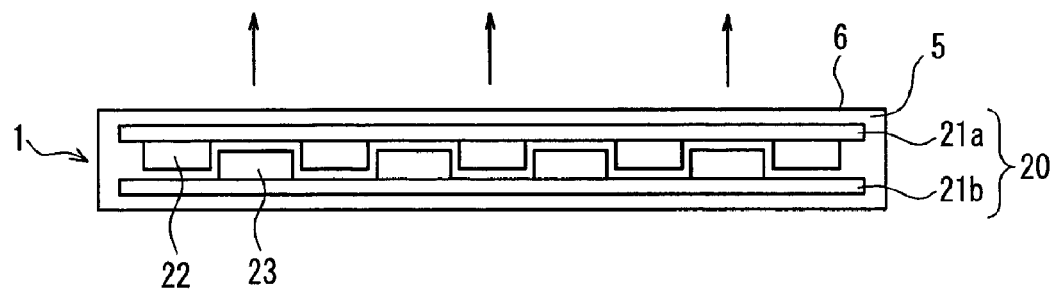

Next, a backlight apparatus according to Embodiment 3 of the present invention will be described with reference to FIGS. 5A to 7B. FIGS. 5A and 5B are views schematically showing a structure of a first example of the backlight apparatus according to Embodiment 3 of the present invention, FIG. 5A is a perspective view thereof, and FIG. 5B is a side view thereof seen from an incident face side.

As shown in FIGS. 5A and 5B, the backlight apparatus of Embodiment 3 is also a sidelight-type backlight apparatus similarly to that of Embodiment 1. Moreover, the backlight apparatus of Embodiment 3 is also provided with a light source unit 20 on the incident face 5 side of the light guide plate 1, similarly to that of Embodiment 1.

However, as shown in FIGS. 5A and 5B, in the backlight apparatus of Embodiment 3, two substrates 21a and 21b that are adjacent to each other in the longitudinal direction are disposed such that mounting faces thereof face each other. Moreover, a plurality of light emitting devices 22 that are mounted on the substrate 21a and a plurality of light emitting devices 23 that are mounted on the substrate 21b are mounted in positions that are not overlapped with each other in the longitudinal direction.

In the example of FIGS. 5A and 5B, each of the light emitting devices 23 that are mounted on the lower-side substrate 21b is mounted so as to be positioned between the light emitting devices 22 that are mounted on the upper-side substrate 21a, and the light emitting devices 22 and the light emitting devices 23 are not in contact with each other. Incidentally, the light emitting devices 22 and 23 are also side emission-type LEDs that are similar to the light emitting devices 4 in Embodiment 1, and emitting directions of the light emitting devices 22 and 23 are directed to the incident face 5.

As described above, according to Embodiment 3, densities of the light emitting devices 22 and 23 on the incident face 5 can be increased further, compared with that of Embodiment 1. Moreover, a thickness of the light source unit 20 in the longitudinal direction can be reduced, thus contributing to reduce a thickness of a liquid crystal display. Further, also in the backlight apparatus shown in FIGS. 5A and 5B, the light emitting devices 22 and 23 on each of the substrates separately can be switched on and off so as to adjust the light amount.

In the light of the improvement of the densities of the light emitting devices, a distance between the substrate 21a and the substrate 21b is preferably set such that the light emitting devices 22 and the light emitting devices 23 are overlapped with each other when viewing the light source unit 20 from the transverse direction. However, if the distance between the substrate 21a and the substrate 21b is small, heat dissipation of the light source unit 2 may be decreased. Thus, in such a case, a heat sink plate 24 is preferably disposed as shown in FIGS. 6A and 6B.

Figure 6A:
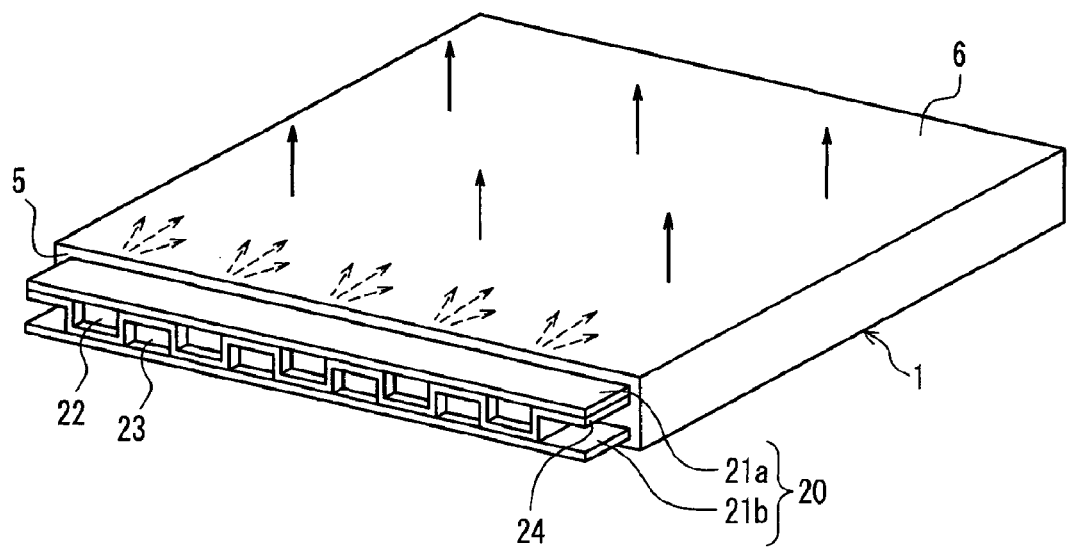
FIGS. 6A and 6B are views schematically showing a structure of a second example of the backlight apparatus according to Embodiment 3 of the present invention.
Figure 6B:
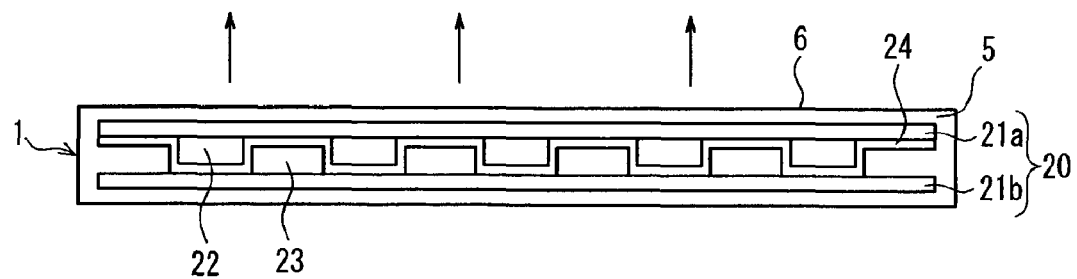

FIGS. 6A and 6B are views schematically showing a structure of a second example of the backlight apparatus according to Embodiment 3 of the present invention, FIG. 6A is a perspective view thereof, and FIG. 6B is a side view thereof seen from the incident face side. In the example of FIG. 6A, the heat sink plate 24 is disposed between the substrate 21a and the substrate 21b. The heat sink plate 24 is formed to have a wave shape so as to be settled between the light emitting devices 22 and the light emitting devices 23.

The heat sink plate 24 is also made of a metal material, similarly to the heat sink plate 8 shown in Embodiment 2. A shape of the heat sink plate 24 is not limited particularly, but it is preferably a shape having a large contact area with the light emitting devices 22 and 23, in the light of the improvement of the heat dissipation property.

Figure 7A:
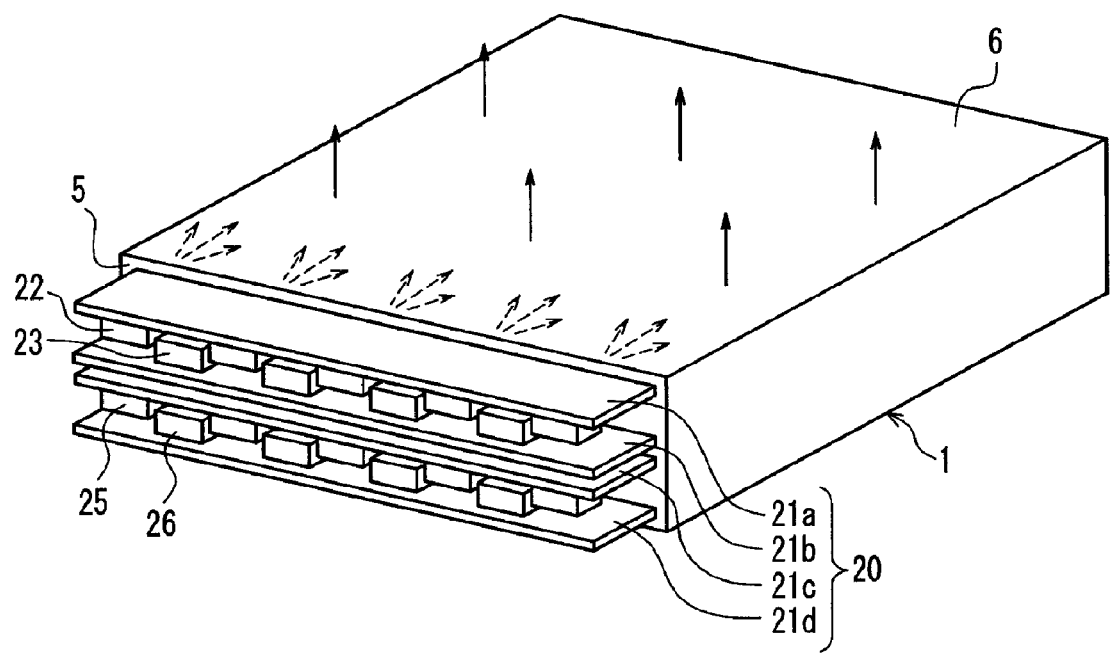
FIGS. 7A and 7B are views schematically showing a structure of a third example of the backlight apparatus according to Embodiment 3 of the present invention.
Figure 7B:
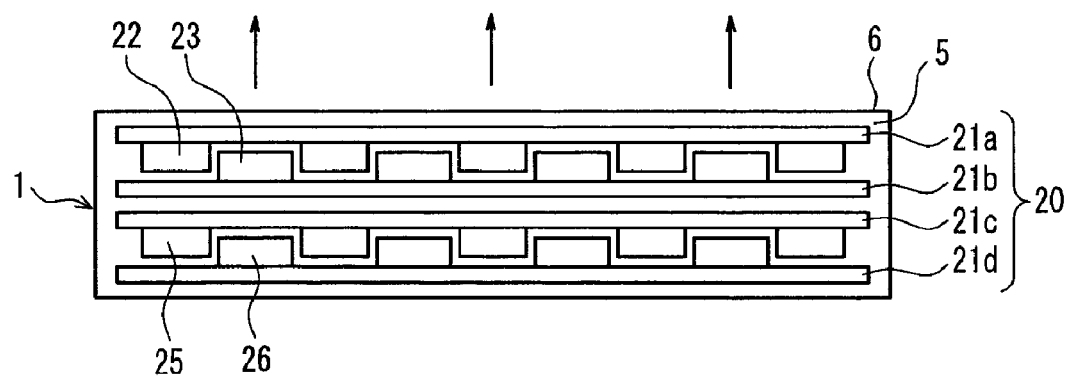

Moreover, in Embodiment 3, the number of the substrates constituting the light source unit 20 is not limited particularly. As shown in FIGS. 7A and 7B, the number of the substrates constituting the light source unit 20 can be further increased.

FIGS. 7A and 7B are views schematically showing a structure of a third example of the backlight apparatus according to Embodiment 3 of the present invention, FIG. 7A is a perspective view thereof, and FIG. 7B is a side view thereof seen from the incident face side. In the example of FIGS. 7A and 7B, the light source unit 20 is provided also with substrates 21c and 21d, besides the substrates 21a and 21b.

Similarly to the substrates 21a and 21b, the substrates 21c and 21d are also adjacent to each other in the longitudinal direction, and are disposed such that mounting faces thereof face each other. Moreover, a plurality of light emitting devices 25 that are mounted on the substrate 21c and a plurality of light emitting devices 26 that are mounted on the substrate 21d are also mounted in positions that are not overlapped with each other in the longitudinal direction. According to the example shown in FIGS. 7A and 7B, the light amount can be further improved, compared with the example shown in FIGS. 5A and 5B.

Incidentally, also in the example shown in FIGS. 7A and 7B, similarly to the example shown in FIGS. 6A and 6B, the heat sink plates 24 can be disposed between the substrate 21a and the substrate 21b, and between the substrate 21c and the substrate 21d, respectively. Moreover, in the example shown in FIGS. 7A and 7B, the heat sink plate can be disposed also between the substrate 21b and the substrate 21c.

Moreover, FIGS. 5A to 7B show only main parts that constitute the backlight apparatus. The backlight apparatus shown in FIGS. 5A to 7B is provided with the light controlling device on the light exit face 6, which is not illustrated though. Further, the reflection members are attached on the lateral face that does not serve as the incident face 5 and on the main face opposed to the light exit face 6, such that reflection faces of the reflection members face the inside of the light guide plate 1.

Preferred Embodiment 4

Figure 8A:
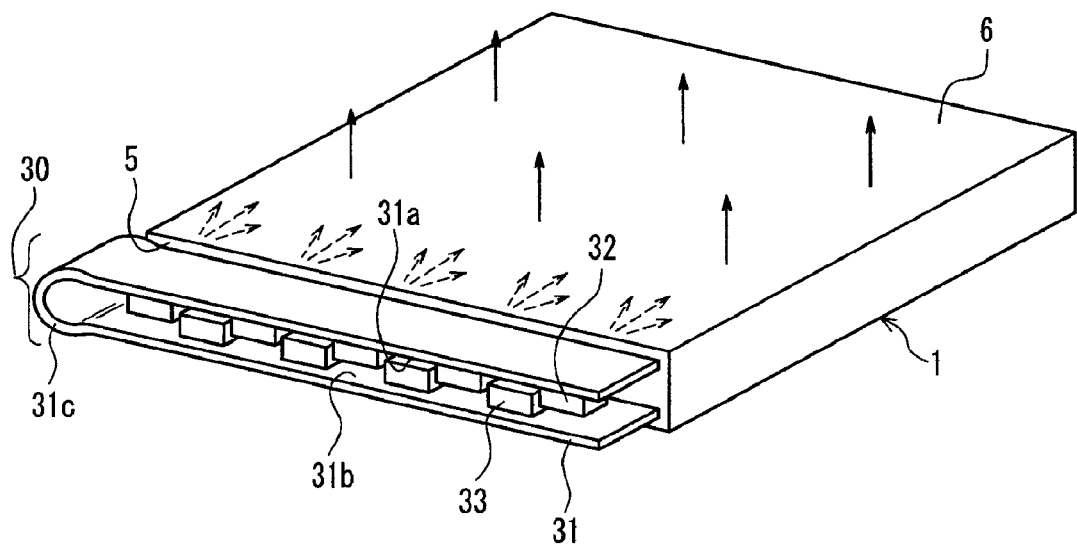
FIGS. 8A and 8B are views schematically showing a structure of a first example of a backlight apparatus according to Embodiment 4 of the present invention.
Figure 8B:
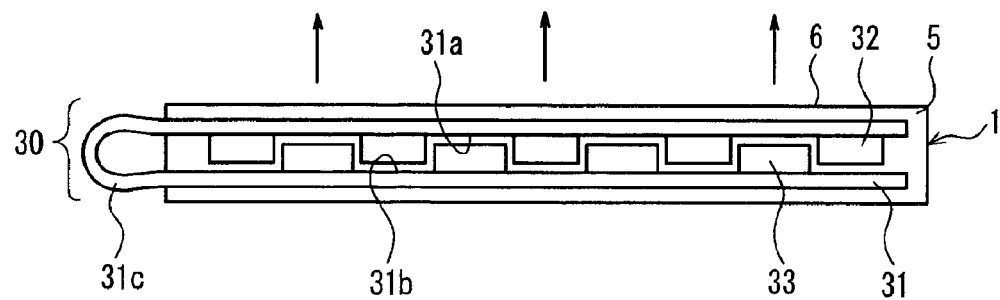
Figure 9:
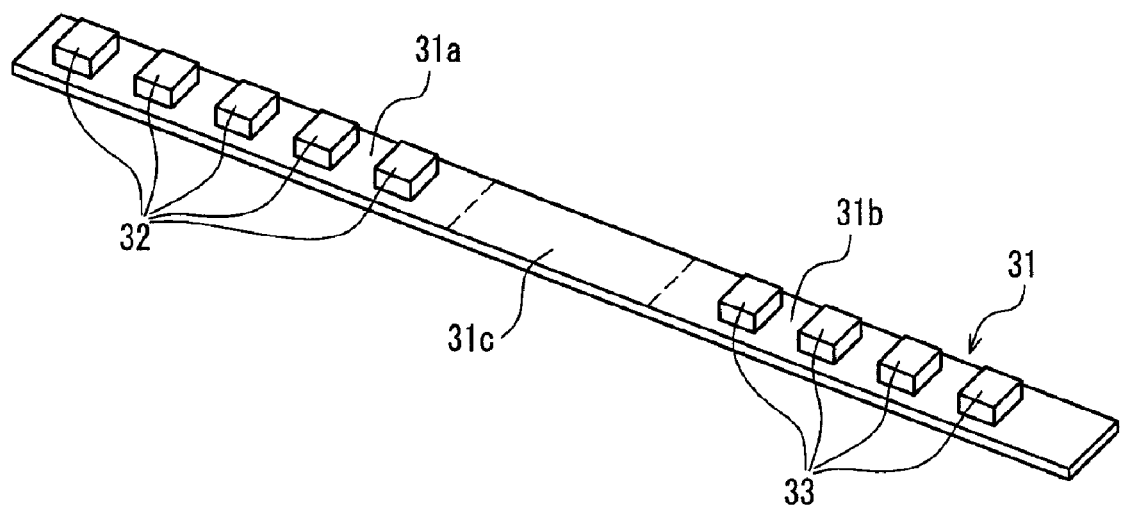
FIG. 9 is a perspective view showing a flexible substrate constituting a light source unit of the backlight apparatus shown in FIGS. 8A and 8B.

Next, a backlight apparatus according to Embodiment 4 of the present invention will be described with reference to FIGS. 8A to 10B. FIGS. 8A and 8B are views schematically showing a structure of a first example of the backlight apparatus according to Embodiment 4 of the present invention, FIG. 8A is a perspective view thereof, and FIG. 8B is a side view thereof seen from an incident face side. FIG. 9 is a perspective view showing a flexible substrate constituting a light source unit of the backlight apparatus shown in FIGS. 8A and 8B.

As shown in FIGS. 8A and 8B, the backlight apparatus of Embodiment 4 is also a sidelight-type backlight apparatus similarly to that of Embodiment 1. Moreover, the backlight apparatus of Embodiment 4 is also provided with a light source unit 30 on the incident face 5 side of the light guide plate 1, similarly to that of Embodiment 1.

However, as shown in FIGS. 8A and 8B, in the backlight apparatus of Embodiment 4, the light source unit 30 is formed by using a flexible substrate 31, instead of using the two or more substrates shown in Embodiments 1 to 3, which have a continuous positional relationship in the longitudinal direction. More specifically, in the example of FIGS. 8A and 8B, the plurality of the light emitting devices are mounted by using the flexible substrate 31, instead of using the substrates 21a and 21b shown in FIGS. 5A and 5B in Embodiment 3, which have a continuous positional relationship in the longitudinal direction. This point will be described below.

As shown in FIG. 9, the flexible substrate 31 is provided with a mounting region 31a on which a plurality of light emitting devices 32 are mounted, and a mounting region 31b on which a plurality of light emitting devices 33 are mounted. Moreover, as shown in FIGS. 8A and 8B, the flexible substrate 31 is folded at a part (a folding region) 31c except for the mounting regions, such that mounting faces of the mounting region 31a and the mounting region 31b are parallel with the main face 6 of the light guide plate 1.

Further, as shown in FIGS. 8A, 8B, and 9, both of the mounting face of the mounting region 31a and the mounting face of the mounting region 31b are on the same face of the flexible substrate 31, and they face each other by the fold at the folding region 31c. Moreover, when the flexible substrate 31 is fold, the light emitting devices 32 that are mounted on the mounting region 31a and the light emitting devices 33 that are mounted on the mounting region 31b are mounted in positions that are not overlapped with each other in the longitudinal direction, similarly to the example shown in FIGS. 5A and 5B in Embodiment 3.

As described above, the flexible substrate 31 functions similarly to the substrate 21a and the substrate 21b shown in FIGS. 5A and 5B. The backlight apparatus shown in FIGS. 8A and 8B has a structure and functions that are similar to those of the backlight apparatus shown in FIGS. 5A and 5B in Embodiment 3, except using the flexible substrate 31.

Accordingly, also in the backlight apparatus of Embodiment 4 shown in FIGS. 8A and 8B, similarly to that of Embodiment 3, densities of the light emitting devices 32 and 33 on the incident face 5 can be further increased, compared with that of Embodiment 1. Also, in the backlight apparatus of Embodiment 4 shown in FIGS. 8A and 8B, a thickness of the light source unit 30 in the longitudinal direction can be reduced, thereby contributing to reduce the thickness of the liquid crystal display.

Moreover, wirings that can supply electric powers to the mounting region 31a and the mounting region 31b separately are preferably provided on the flexible substrate 31 in the backlight apparatus shown in FIGS. 8A and 8B. In this case, the light emitting device 32 and the light emitting device 33 separately can be switched on and off, whereby the light amount of the backlight apparatus can be adjusted easily.

In Embodiment 4, the number of the mounting regions and the number of the folding regions of the flexible substrate are not limited particularly. For example, an example shown in FIGS. 10A and 10B can be adopted. In the example shown in FIGS. 10A and 10B, the plurality of the light emitting devices are mounted by using a flexible substrate 34, instead of using the substrates 21a and 21b shown in FIGS. 7A and 7B in Embodiment 3, which have the continuous positional relationship in the longitudinal direction. This point will be described below.

Figure 10A:
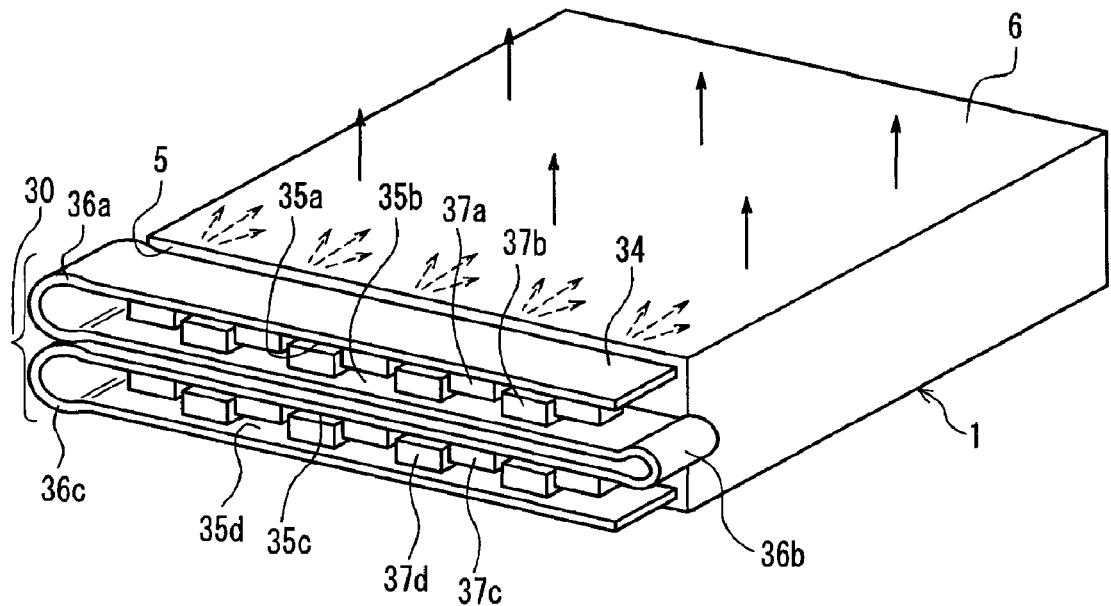
FIGS. 10A and 10B are views schematically showing a structure of a second example of the backlight apparatus according to Embodiment 4 of the present invention.
Figure 10B:
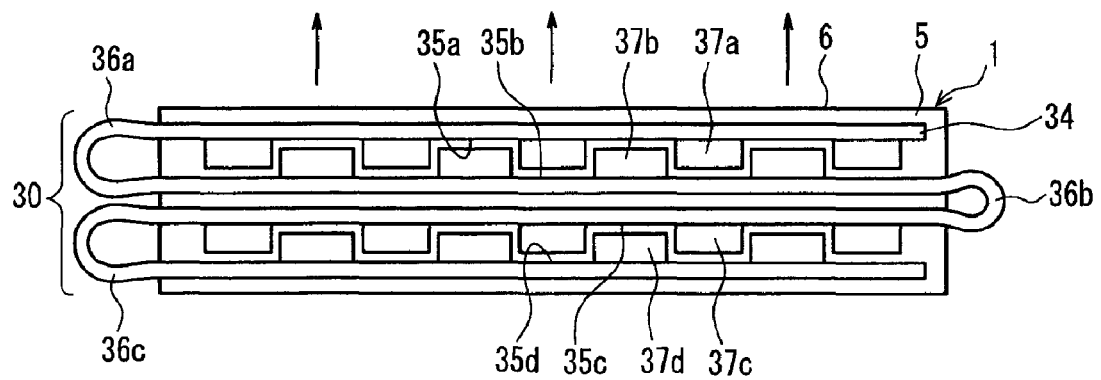

FIGS. 10A and 10B are views schematically showing a structure of a second example of the backlight apparatus according to Embodiment 4 of the present invention, FIG. 10A is a perspective view thereof, and FIG. 10B is a side view thereof seen from the incident face side. As shown in FIGS. 10A and 10B, the flexible substrate 34 is provided with mounting regions 35a to 35d and folding regions 36a to 36c. All of mounting faces of the mounting regions 35a to 35d are on the same face of the flexible substrate 34.

As shown in FIGS. 10A and 10B, the folding region 36a is folded such that the mounting faces of the mounting region 35a and the mounting region 35b face each other. The folding region 36b is folded such that the mounting faces of the mounting region 35b and the mounting region 35c do not face each other. The folding region 36c is folded such that the mounting faces of the mounting region 35c and the mounting region 35d face each other. These folds are achieved such that the mounting faces of the mounting regions 35a to 35d are parallel with the main face 6 of the light guide plate 1, as shown in FIGS. 10A and 10B.

Moreover, the light emitting devices 37a that are mounted on the mounting region 35a, and the light emitting devices 37b that are mounted on the mounting region 35b are mounted in positions that are not overlapped with each other in the longitudinal direction, similarly to the example shown in FIGS. 7A and 7B in Embodiment 3. Also, the light emitting devices 37c that are mounted on the mounting region 35c, and the light emitting devices 37d that are mounted on the mounting region 34d are mounted in positions that are not overlapped with each other in the longitudinal direction, similarly to the example shown in FIGS. 7A and 7B in Embodiment 3.

As described above, the flexible substrate 34 functions similarly to the substrates 21a to 21d shown in FIGS. 7A and 7B. The backlight apparatus shown in FIGS. 10A and 10B has a structure and functions that are similar to those of the backlight apparatus shown in FIGS. 7A and 7B in Embodiment 3 except for using the flexible substrate 34. Moreover, also in the backlight apparatus shown in FIGS. 10A and 10B, wirings that can supply electric powers to the mounting regions 35a to 35d separately are preferably provided on the flexible substrate 34, in the light of the facilitation for adjusting the light amount.

Moreover, in Embodiment 4, it is possible to use one flexible substrate instead of the substrates 3a to 3c shown in FIGS. 1A, 1B, 4A, and 4B. In this case, a flexible substrate provided with three mounting regions, on which amounting face of a central mounting region is positioned opposite to a mounting face of other mounting region, may be used. This flexible substrate can function similarly to the substrates 3a to 3c shown in FIGS. 1A, 1B, 4A, and 4B.

In Embodiment 4, a shape of the flexible substrate is not limited to the slim rectangular shape shown in FIGS. 8A to 10B. Here, other example of the flexible substrate that can be used for the light source unit shown in FIGS. 8A and 8B will be described with reference to FIGS. 11A to 12B. FIGS. 11A and 11B are plan views showing an example where a connection portion is formed on the flexible substrate shown in FIG. 9, and FIGS. 11A and 11B respectively show examples where the connection portion is formed in different portions.

In the example of FIG. 11A, the connection portion 38 is provided at an end of a portion of the flexible substrate 31 serving as the mounting region 31b such that the mounting region 31b becomes to have an L-shape. Whereas, in the example of FIG. 1B, the connection portion 38 is provided near a center of a portion of the flexible substrate 31 which serves as the mounting region 31b such that the mounting region 31b becomes to have a T-shape.

The connection portion 38 shown in FIGS. 11A and 11B is utilized for connecting the flexible substrate 31 with a power supply portion (not illustrated), a main substrate (not illustrated) and the like. To the connection portion 38, a terminal for a connector connection and a soldering connection is provided, which is not illustrated though. It should be noted that, in Embodiment 4, a position for providing the connection portion 38 is not limited particularly. Moreover, in the example of FIGS. 11A and 11B, the connection portion 38 has a rectangular shape, but the shape of the connection portion 38 is not limited particularly. The position and the shape of the connection portion 38 can be set appropriately according to the structures of the backlight apparatus and the liquid crystal display.

Figure 12A:
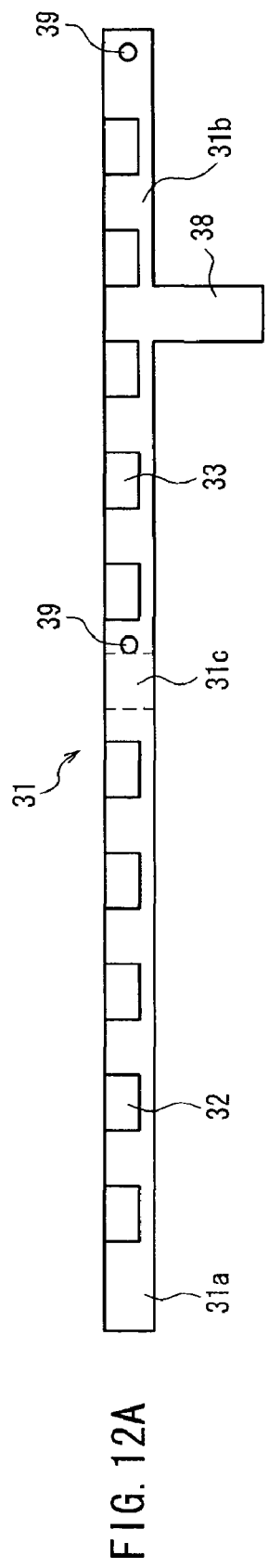
FIGS. 12A and 12B are plan views showing an example where a positioner is provided on the flexible substrate shown in FIG. 11B, and FIGS. 12A and 12B respectively show examples where the positioner have different forms.
Figure 12B:
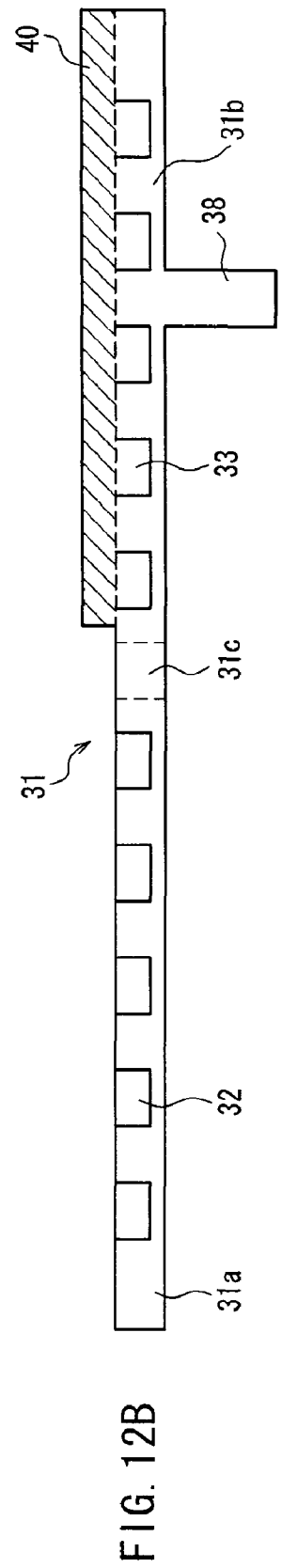

FIGS. 12A and 12B are plan views showing an example where a positioner is provided on the flexible substrate shown in FIG. 11B, and FIGS. 12A and 12B respectively show examples where the positioner have different forms. In the example of FIG. 12A, the positioner is two through holes 39 that are provided in the mounting region 31b. Into the through holes 39, protrusions (not illustrated) that are provided to a frame (not illustrated) of the liquid crystal display or the backlight apparatus are inserted, thereby positioning the flexible substrate 31.

In the example of FIG. 12B, the positioner is an attachment portion 40. The attachment portion 40 is provided by expanding the mounting region 31b on the light guide plate 1 (see FIGS. 8A and 8B) side. The attachment portion 40 is attached to a face opposed to the light exit face 6 (see FIGS. 8A and 8B) of the light guide plate 1 by an adhesive. Thereby, the flexible substrate 31 is positioned.

As described above, in the backlight apparatus according to Embodiment 4, the flexible substrate is used instead of the plurality of the substrates that are shown in Embodiments 1 to 3. Thus, a weight of the backlight apparatus can be reduced. Moreover, compared with Embodiments 1 to 3, the number of the members can be reduced and wiring structures can be simplified, thus leading to the reduction of the manufacturing cost.

Incidentally, FIGS. 8A, 8B, 10A, and 10B show only the main parts constituting the backlight apparatus. The backlight apparatus shown in FIGS. 8A, 8B, 10A, and 10B is provided with the light controlling device on the light exit face 6, which is not illustrated though. Moreover, the reflection members are attached on the lateral face that does not serve as the incident face 5 and on the main face opposed to the light exit face 6, such that reflection faces of the reflection members face the inside of the light guide plate 1, which are not illustrated.

Preferred Embodiment 5

Next, the backlight apparatus according to Embodiment 5 of the present invention will be described with reference to FIGS. 13A to 15B.

Figure 13A:
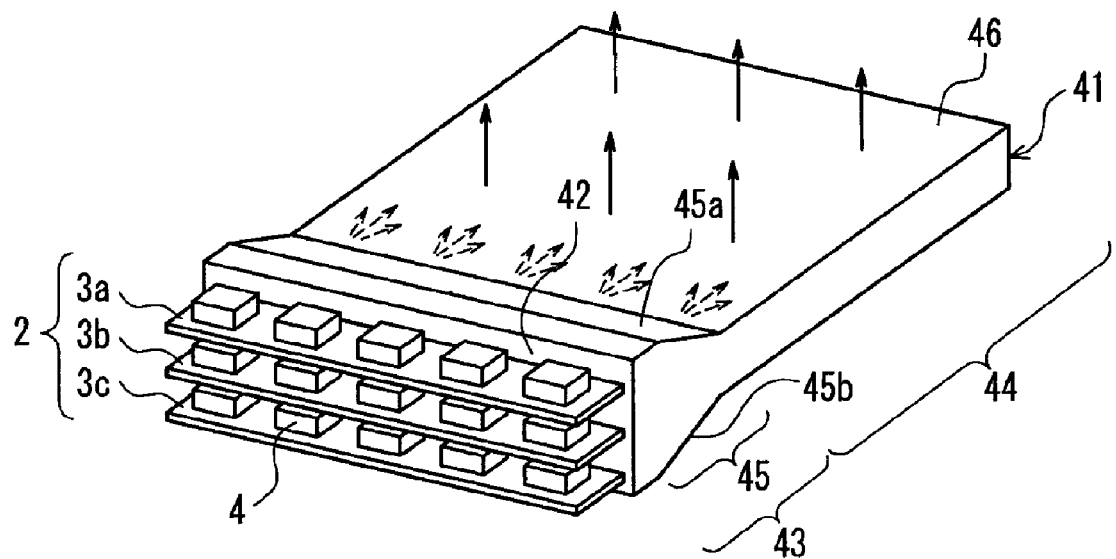
FIGS. 13A and 13B are views schematically showing a structure of a first example of a backlight apparatus according to Embodiment of the present invention.
Figure 13B:
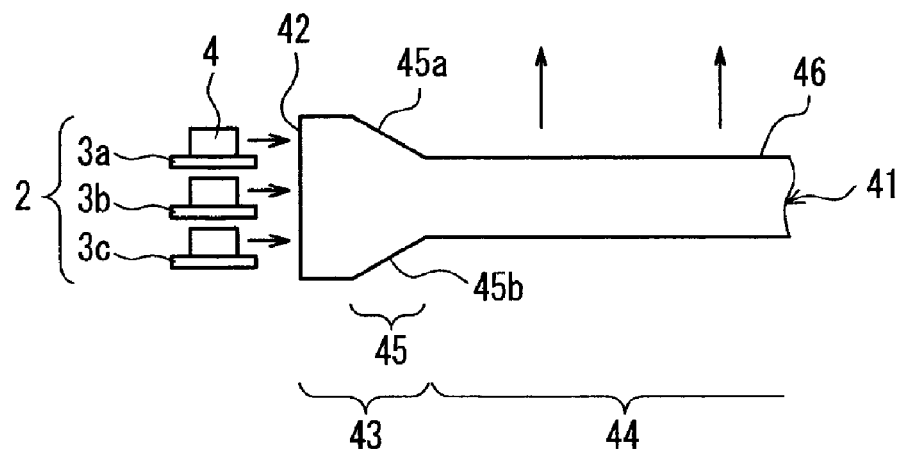

FIGS. 13A and 13B are views schematically showing a structure of a first example of the backlight apparatus according to Embodiment 5 of the present invention, FIG. 13A is a perspective view thereof, and FIG. 13B is a side view thereof.

Figure 14A:
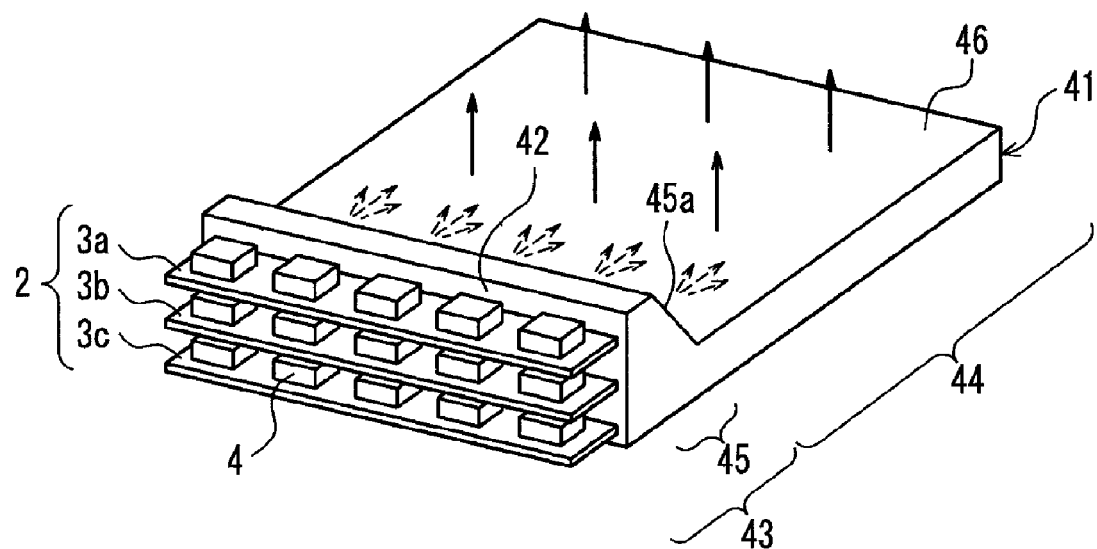
FIGS. 14A and 14B are views schematically showing a structure of a second example of the backlight apparatus according to Embodiment 5 of the present invention.
Figure 14B:
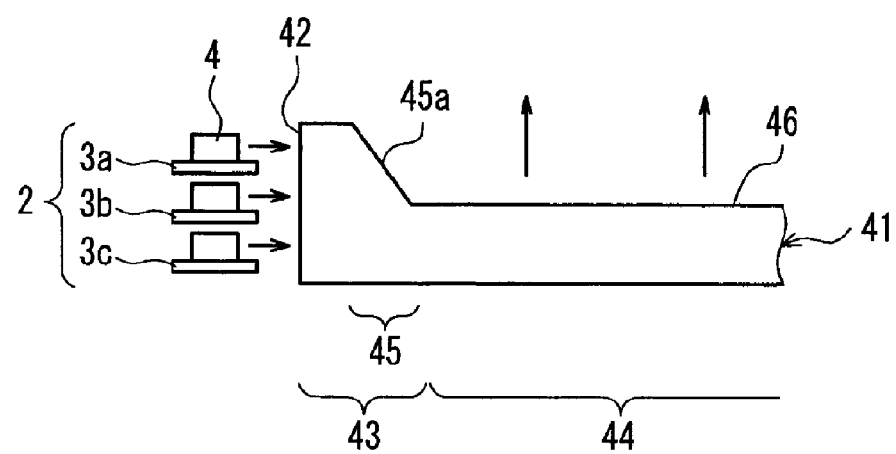
Figure 15A:
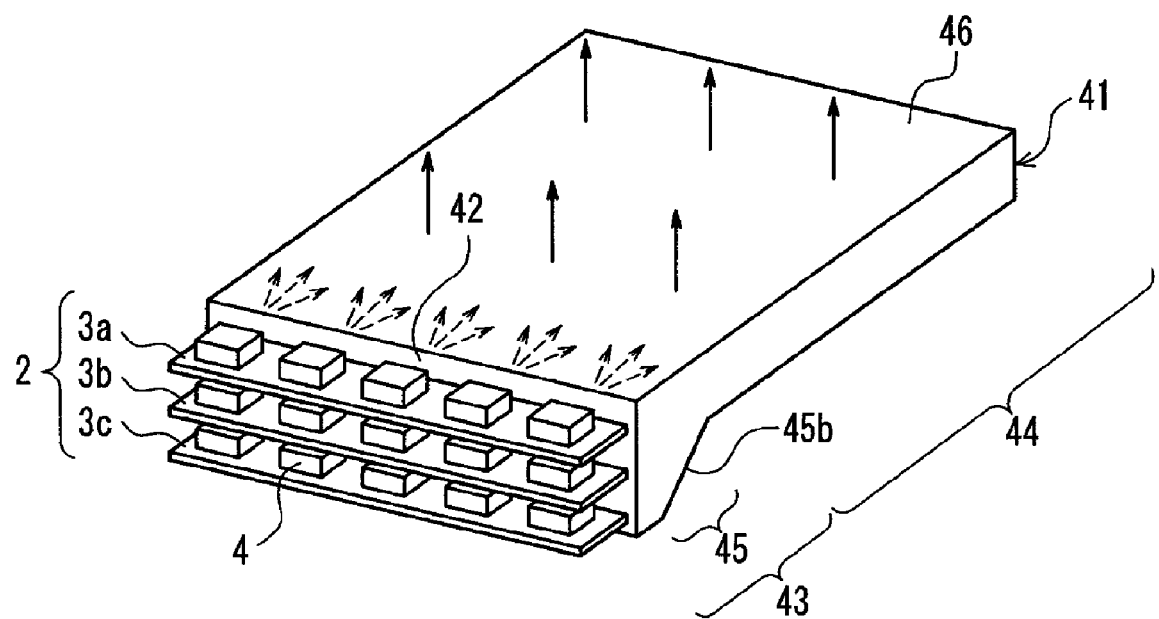
FIGS. 15A and 15B are views schematically showing a structure of a third example of the backlight apparatus according to Embodiment 5 of the present invention.
Figure 15B:
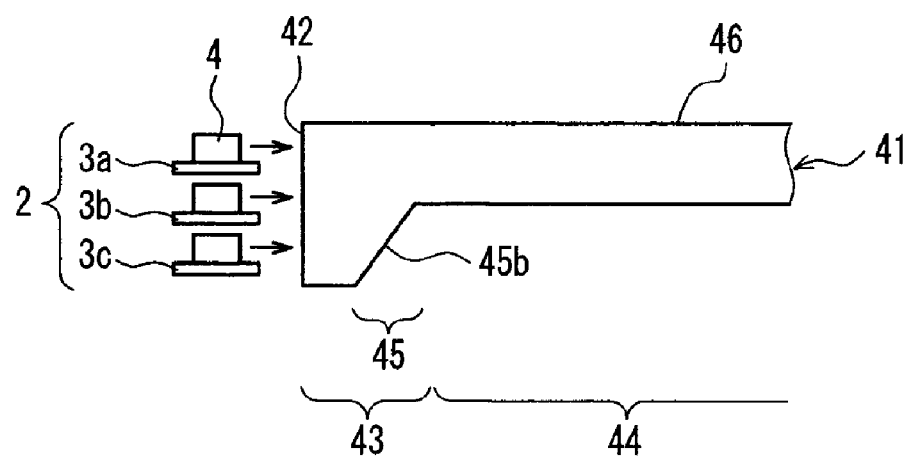

FIGS. 14A and 14B are views schematically showing a structure of a second example of the backlight apparatus according to Embodiment 5 of the present invention, FIG. 14A is a perspective view thereof, and FIG. 14B is a side view thereof. FIGS. 15A and 15B are views schematically showing a structure of a third example of the backlight apparatus according to Embodiment 5 of the present invention, FIG. 15A is a perspective view thereof, and FIG. 15B is a side view thereof.

As shown in FIGS. 13A and 13B, the backlight apparatus of Embodiment 5 is also a sidelight-type backlight apparatus similarly to that of Embodiment 1. Moreover, the backlight apparatus of Embodiment 5 is also provided with the light source unit 2 on an incident face 42 side of a light guide plate 41, similarly to that of Embodiment 1. In the example of FIGS. 13A and 13B, the light source unit 2 is the same as the light source unit shown in FIG. 1 in Embodiment 1.

However, as shown in FIGS. 13A and 13B, in the backlight apparatus of Embodiment 5, the light guide plate 41 has a portion (hereinafter, called a "thickness-increased portion") 45 that is formed at an end portion 43 on the incident face 42 side, such that a thickness of the portion 45 is gradually increased as is closer to the incident face 42. Thus, a length (a thickness in the vicinity of the incident face 42) of the incident face 42 in the longitudinal direction is larger than a thickness of a portion 44 except for the end portion 43. Further, a main face of the portion 44 except for the end portion 43 serves as the light exit face 46.

As described above, in Embodiment 5, the light guide plate 41 formed such that the portion (the end portion 43) constituting the incident face 42 is thick, and the portion (the portion 44 except for the end portion 43) constituting the light exit face 46 is thin is used. Thus, regardless of the length (the number of stages of the light emitting devices 4 that are superimposed) of the light guide plate 41 in the thickness direction in the light source unit 2, a reduction of the thickness of the portion of the light exit face of the light guide plate 41 can be achieved. Thus, a thickness and a weight of the backlight apparatus itself can be reduced, and accordingly, a thickness and a weight of the liquid crystal display on which this backlight apparatus is mounted can be reduced.

In the example of FIGS. 13A and 13B, as shown in FIG. 13B, the end portion 43 has a tunnel shape in which a pair of inclined faces 45*a* and 45*b* are formed at the thickness-increased portion 45, but the shape of the end portion 43 is not limited to this in Embodiment 5. For example, the end portion 43 may have a shape where the inclined face 45*a* is formed only on the light exit face 6 side as shown in FIGS. 14A and 14B, and may have a shape where the inclined face 45*b* is formed only on an opposite side of the light exit face 6 as shown in FIGS. 15A and 15B. It is determined to adopt which of the shapes shown in FIGS. 13A to 15B, by considering an internal space of the liquid crystal display.

Incidentally, in the examples of FIGS. 13A to 15B, the light source unit 2 shown in FIGS. 1A and 1B is used as the light source unit, but Embodiment 5 is not limited to this. In Embodiment 5, besides the light source unit shown in FIGS. 1A and 1B, the light source unit shown in any of FIGS. 2A, 2B, 4A, 4B, 5A to 8B, 10A, and 10B can also be used.

Moreover, FIGS. 13A to 15B show only main parts that constitute the backlight apparatus. The backlight apparatus shown in FIGS. 13A to 15B is provided with the light controlling device on the light exit face 46, which is not illustrated though. Moreover, in the light guide plate 41, the reflection member is attached on a portion except for the light exit face 46 and the incident face 42 such that a reflection face of the reflection member faces the inside of the light guide plate 41, which is not illustrated.

As described above, in the backlight apparatus of the present invention, the density of the light emitting devices on the incident face can be increased, so that the number of the light emitting devices that can be disposed can be increased so as to increase the light amount.

What is claimed is:

1. A backlight apparatus of a sidelight type comprising:
 a light guide plate having an incident face on a lateral face; and
 a light source unit having a plurality of substrates; wherein
 each of the plurality of substrates is respectively disposed on the incident face side of the light guide plate such that a face of each of the plurality of substrates is parallel with a main face of the light guide plate;
 the plurality of substrates are arranged adjacent to one another in a thickness direction of the light guide plate;
 a plurality of light emitting devices are mounted in columns on each of the substrate faces of the plurality of substrates such that light emitted from the plurality of light emitting devices is directed to the incident face;
 a heat sink plate is disposed between adjacent ones of the plurality of light emitting devices; and
 switching on of the plurality of light emitting devices on each of the plurality of substrates is controlled independently of any other of the plurality of substrates.

2. The backlight apparatus according to claim 1, wherein:
 two adjacent substrates among the plurality of substrates are disposed such that mounting faces of the two adjacent substrates face each other; and
 a first group of the plurality of light emitting devices that are mounted on one of the two adjacent substrates and a second group of the plurality of light emitting devices that are mounted on the other one of the two adjacent substrates are mounted in positions that are not overlapped with each other in the thickness direction of the light guide plate.

3. The backlight apparatus according to claim 1, wherein the thickness of a portion of the light guide plate decreases in a direction extending away from the incident face of the light guide plate.

4. The backlight apparatus according to claim 1, wherein the plurality of light emitting devices are light emitting diodes.

5. The backlight apparatus according to claim 4, wherein the light emitting diodes emit white color light.

6. The backlight apparatus according to claim 4, wherein the light emitting diodes include a red color light emitting diode, a green color light emitting diode, and a blue color light emitting diode.

7. A liquid crystal display comprising the backlight apparatus according to claim 1.

* * * * *